(12) United States Patent
Stofer et al.

(10) Patent No.: US 10,135,488 B2
(45) Date of Patent: Nov. 20, 2018

(54) METHOD FOR DEINTERLEAVING RADAR SIGNALS

(71) Applicant: THALES, Courbevoie (FR)

(72) Inventors: Daniel Stofer, Elancourt (FR); Jean-Francois Grandin, Elancourt (FR); Jean-Marie Lemoine, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/540,078

(22) PCT Filed: Dec. 30, 2015

(86) PCT No.: PCT/EP2015/081423
§ 371 (c)(1),
(2) Date: Jun. 27, 2017

(87) PCT Pub. No.: WO2016/107905
PCT Pub. Date: Jul. 7, 2016

(65) Prior Publication Data
US 2017/0366223 A1    Dec. 21, 2017

(30) Foreign Application Priority Data

Dec. 31, 2014 (FR) ..................... 14 03062

(51) Int. Cl.
*H04B 1/18* (2006.01)
*H04B 1/7163* (2011.01)
(Continued)

(52) U.S. Cl.
CPC ............ *H04B 1/7163* (2013.01); *G01S 7/292* (2013.01); *G01S 7/32* (2013.01)

(58) Field of Classification Search
CPC .............................. H04B 1/7163; G01S 7/292
See application file for complete search history.

(56) References Cited

U.S. PATENT DOCUMENTS

2007/0133720 A1* 6/2007 Rivaz .................. H04B 1/7183
375/343
2011/0150053 A1    6/2011 Kim
(Continued)

OTHER PUBLICATIONS

Mardia et al., "New Techniques for the Deinterleaving of Repetitive Sequences", IEE Proceedings F. Communications, Radar & Signalprocessing, Aug. 1, 1989, pp. 149-154, vol. 136. No. 4, Part F.

(Continued)

*Primary Examiner* — Dac Ha
(74) *Attorney, Agent, or Firm* — Young & Thompson

(57) ABSTRACT

Disclosed is a method for deinterleaving radar signals, the method including: —the reception of electromagnetic signals by a receiver (12) and the extraction of the pulses from the received signals, and —the formation of pulse trains grouping together at least three pulses spaced apart by a same pulse repetition interval, each pulse train being defined by the pulse repetition interval. The method further includes: —the grouping together of the pulse trains having a same pulse repetition interval according to a predefined grouping law in order to form pulse plateaus, and —the association of the pulse plateaus according to at least one predefined association law in order to obtain deinterleaved radar signals formed from the concatenation of the pulse trains of the associated pulse plateaus.

11 Claims, 7 Drawing Sheets

Figure 1:
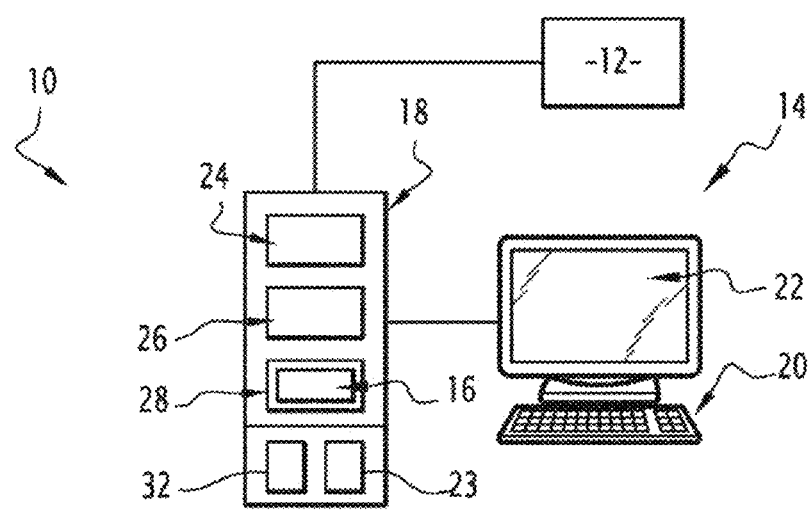

(51) Int. Cl.
  *G01S 7/292* (2006.01)
  *G01S 7/32* (2006.01)

(56) References Cited

U.S. PATENT DOCUMENTS

2015/0116141 A1* 4/2015 Hammack ............... G01S 7/021
                                                            342/13
2016/0209492 A1* 7/2016 Grandin .................. G01S 7/021

OTHER PUBLICATIONS

Inaba, "Interference Suppression in FMICW Radar with Staggared Pulse Repetition Interval", Electronics & Communications in Japan, Part I, Dec. 1, 2007, pp. 86-100, vol. 90, No. 12.
International Search Report, dated Mar. 21, 2016, from corresponding PCT application No. PCT/EP2015/081423.
FR Search Report, dated Aug. 10, 2015, from corresponding FR application No. 14 03062.

* cited by examiner

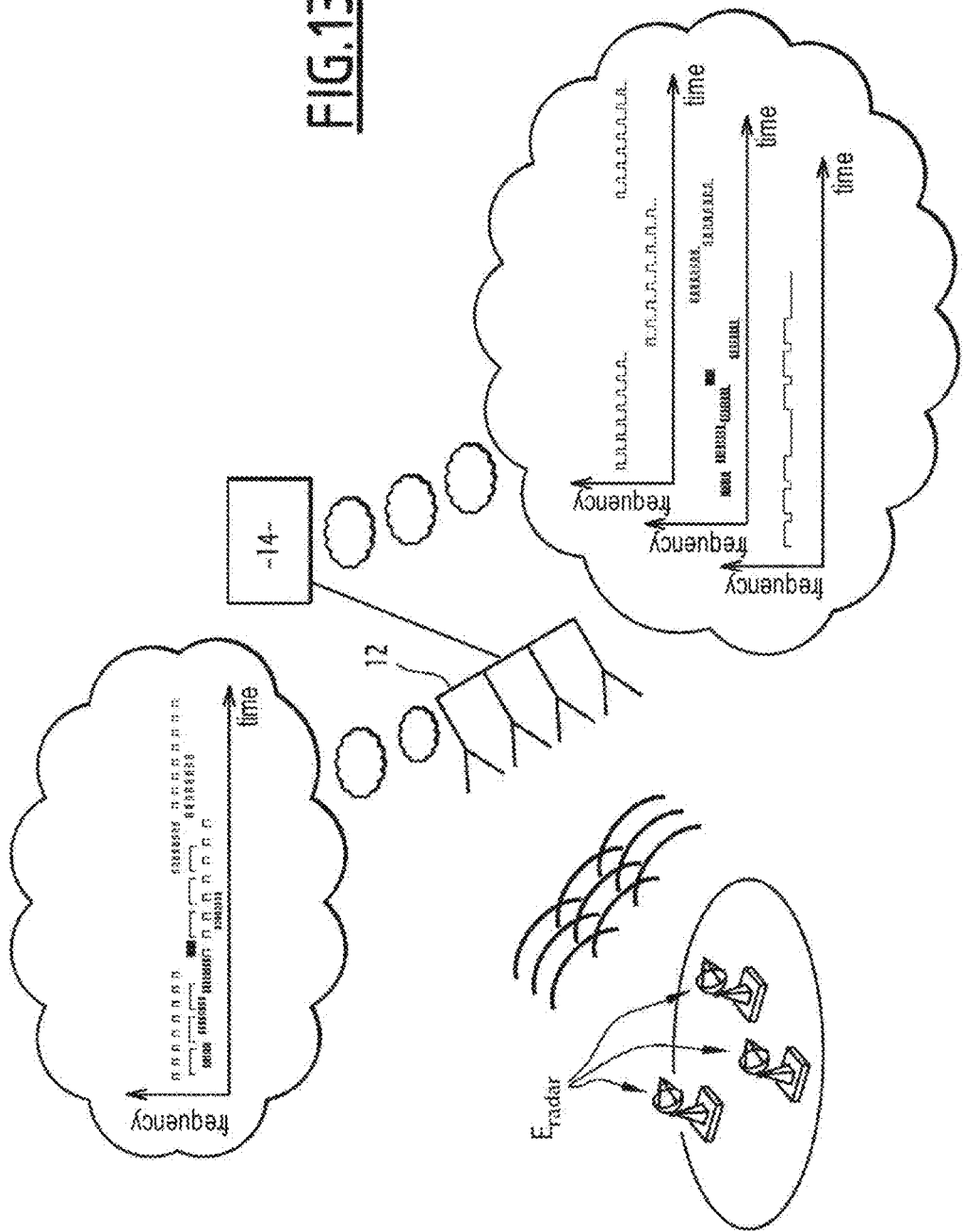

METHOD FOR DEINTERLEAVING RADAR SIGNALS

The present invention relates to a method for deinterleaving radar signals, the method comprising:
- the reception of electromagnetic signals by a receiver and the extraction of the pulses from the received signals, and
- the formation of pulse trains grouping together at least three pulses spaced apart by a same pulse repetition interval, each pulse train being defined by the pulse repetition interval.

The present invention also relates to an associated deinterleaving device.

One issue in electronic warfare consists of intercepting radio transmissions from detection systems, such as radar transmitters.

The presence of many transmitters means that the intercepted signals are interleaved, i.e., the signals transmitted by a radar transmitter of interest are scrambled by other signals coming from the ambient electromagnetic environment. There is therefore a need to deinterleave the intercepted signals to separate the different signals transmitted by the different radar transmitters. Yet signals transmitted by a same radar transmitter may have variable features, defining a waveform, in particular in terms of pulse repetition interval of the signals or carrier frequency of the pulses of the signals, which makes the deinterleaving process complex.

The great wealth of waveforms in the electromagnetic world corresponds to a wide variety of deinterleaving processing operations seeking to extract pulses from a same waveform of the ambient electromagnetic environment. More particularly, the technical field covered by this method relates to the deinterleaving of waveforms with a medium or short pulse repetition interval (up to several hundreds of microseconds). These waveforms are generally made up of several pulse trains.

It is known to use radar signal extractors implementing a two-step process for deinterleaving radar signals. The first step consists of forming pulse trains from the set of intercepted pulses. The second step consists of grouping together the formed pulse trains to obtain deinterleaved radar signals.

The first step for forming pulse trains uses the statistical information from the intercepted signals, such as the frequencies of the pulse carriers of the signals, the pulse repetition intervals and the arrival directions of the pulses.

The second step for grouping together the pulse trains groups the formed pulse trains together according to their proximity to form deinterleaved signals.

Nevertheless, the existing algorithms for grouping the pulse trains together do not offer the same level of maturity as those for forming pulse trains. In particular, the step for grouping pulse trains together is generally approached as a "clustering" or "data classification" problem, where each train is compared to another according to a single distance criterion. However, the waveforms formed by the pulse trains are very diverse, certain families of waveforms being able to have completely antagonistic features with respect to one another. Consequently, a single distance criterion may lead to the reconstruction of erroneous signals.

The technical problem pertains to grouping together pulse trains coming from a same radar signal in a dense electromagnetic environment where several separate waveforms may appear at the same time, the difficulty consisting of not grouping pulse trains together incorrectly.

US 2011/0150053 A describes a method and an apparatus for detecting a radar signal. The method comprises collecting a plurality of pulses based on a reference signal. The method also comprises classifying the pulses in groups based on the similarity of the pulse widths.

The article by MARDIA H. K. titled "New techniques for the deinterleaving of repetitive sequences" published on Aug. 1, 1989 in IEE Proceedings F. Communications, Radar & Signal Processing, Institution of Electrical Engineers, volume 136, issue 4, part F, pages 149 to 154, describes an algorithm for quickly and precisely deinterleaving several repetitive signals.

There is therefore a need for a method for deinterleaving radar signals making it possible to group pulse trains together with better reliability, while limiting the risks of obtaining an erroneous deinterleaved signal, while being quick to carry out.

To that end, the invention relates to a method for deinterleaving radar signals of the aforementioned type, wherein the method further comprises:
- the grouping together of the pulse trains having a same pulse repetition interval according to a predefined grouping law in order to form pulse plateaus, and
- the association of the pulse plateaus according to at least one predefined association law in order to obtain deinterleaved radar signals formed from the concatenation of the pulse trains of the associated pulse plateaus.

According to specific embodiments, the deinterleaving method comprises one or more of the following features, considered alone or according to any technically possible combinations:
- each pulse train is also defined by at least one element chosen from a group made up of: the time of arrival of the first pulse of the pulse train, the time of arrival of the last pulse of the pulse train, the frequency of the pulses of the pulse train, the duration of the pulses of the pulse train and the direction of arrival of the pulses of the pulse train.
- before the grouping step, the method comprises a step for classification of the pulse trains according to their carrier frequency to obtain two classes of pulse trains: one class grouping together the pulse trains with a fixed carrier frequency and the other class grouping together the pulse trains with a variable carrier frequency, the grouping step being carried out for each of the two classes of pulse trains and making it possible to obtain single-frequency pulse plateaus from the class of the single-frequency pulse trains and frequency agile pulse plateaus from the class of frequency agile pulse trains.
- the association step comprises a phase for grouping together pulse plateaus having different pulse repetition intervals and that are linked together over time to obtain pulse plateau groups by switching.
- the association step comprises a phase for grouping together fixed carrier frequency pulse plateaus, having identical pulse repetition intervals and being superimposed over time to obtain pulse plateau groups by overlapping.
- each of the grouping and association laws is implemented by at least one algorithm making it possible to obtain groups from elements, the elements designating pulse trains during the grouping step and pulse plateaus during the association step, the groups designating pulse plateaus during the grouping step and groups of pulse plateaus during the association step, the algorithm comprising:
  - choosing a reference element from among a set of elements, deleting the reference element from the set of elements and adding, in a set of groups, a reference group comprising the reference element, selecting, in the set of elements, elements compatible with the reference group according to a set of criteria to obtain a set of candidate elements, evaluating the distance between the reference group and each element of the set of candidate elements, annexing the element from the set of candidate elements minimizing a distance from the reference group and deleting the annexed element from the set of elements, repeating the selection, evaluation and annexing phases as long as the set of candidate elements comprises elements, and repeating all of the preceding phases as long as the set of elements comprises elements.

the reference element is the element from the set of elements for which the time of arrival of the first pulse is the smallest.

the set of criteria evaluates the compatibility of the elements from the set of elements with the reference group based on one or several features, the features being chosen from a group comprising: the direction of arrival of the elements, the temporal superposition of the elements, the carrier frequency of the elements, the pulse width of the elements, the pulse repetition interval of the elements, the phase of the elements and the number of pulses of the elements.

the criteria are chosen according to statistics on the features of the radar waveforms from a database.

for the grouping law, the distance is the time deviation separating the last pulse of the reference group from the first pulse of the candidate elements of the set of candidate elements, and for the association law, the distance is an overlap rate between the reference group and the candidate element from the set of candidate elements or a score making it possible to select, among the set of candidate elements, the elements sharing the most features in common with the reference group.

before the grouping step, the method comprises a step for rejecting inconsistent pulse trains in terms of pulse repetition interval.

before the grouping step, the method comprises a step for rejecting pulse trains for which the pulse repetition interval is above a pulse repetition interval threshold and for which the number of pulses is below a pulse number threshold.

the association step comprising at least one grouping phase chosen from among:

a phase for grouping together repetition interval pulse plateaus for different pulses and that are linked together over time to obtain pulse plateau groups by switching, and a phase for grouping together fixed carrier frequency pulse plateaus, having identical pulse repetition intervals and being superimposed over time to obtain pulse plateau groups by overlapping.

The invention also relates to a device for deinterleaving radar signals, comprising:

a receiver able to receive electromagnetic signals, a signal digital processing unit able to extract the pulses from the signals received by the receiver, and a readable information medium, on which a computer program is stored comprising program instructions, the computer program being able to be loaded on a data processing unit and suitable for driving the implementation of a method as previously described when the computer program is implemented on the data processing unit.

Figure 2:
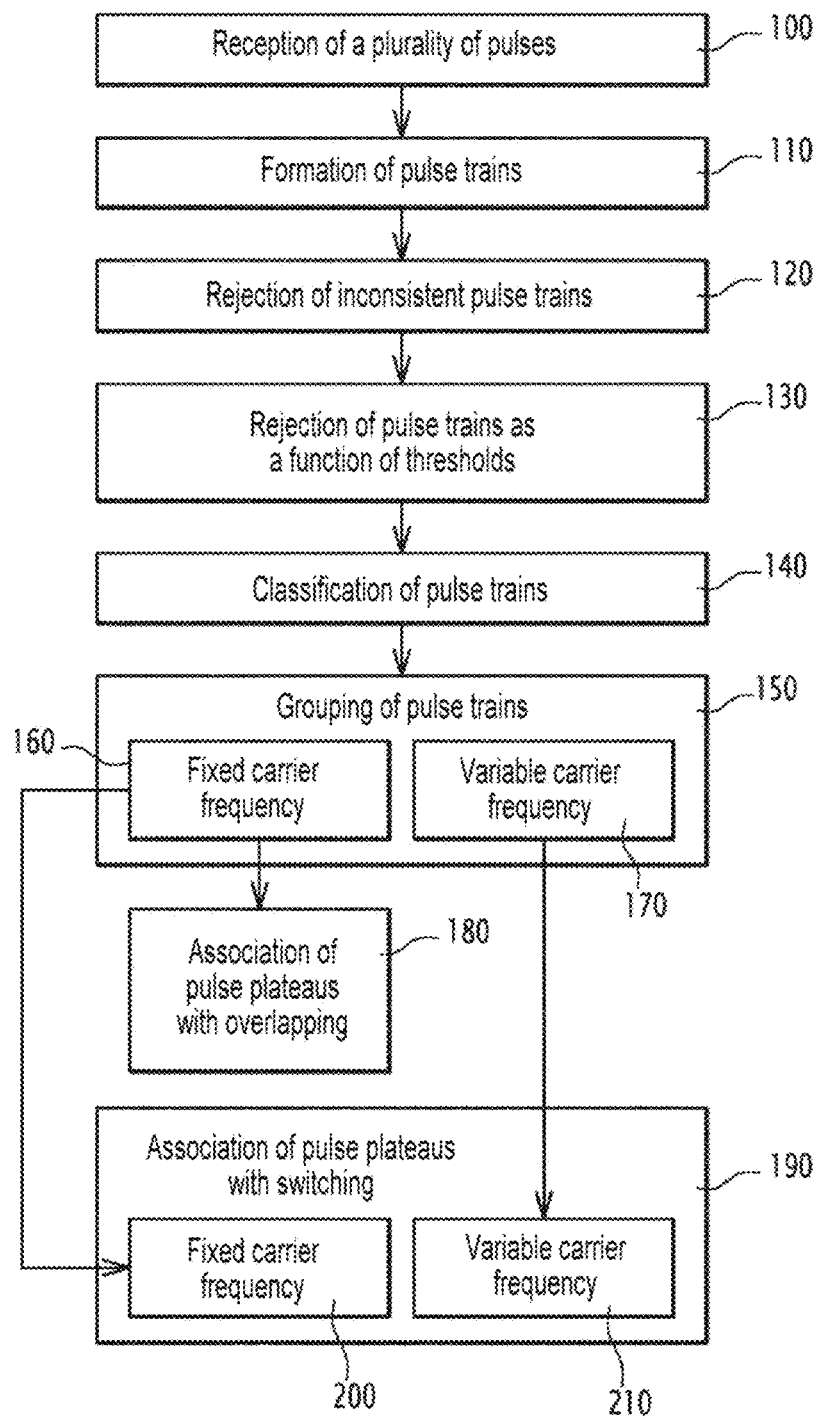
Figure 3:
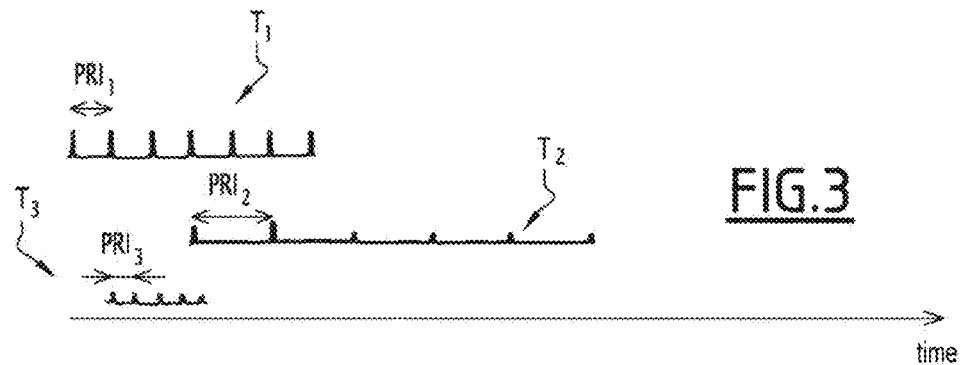
Figure 4:
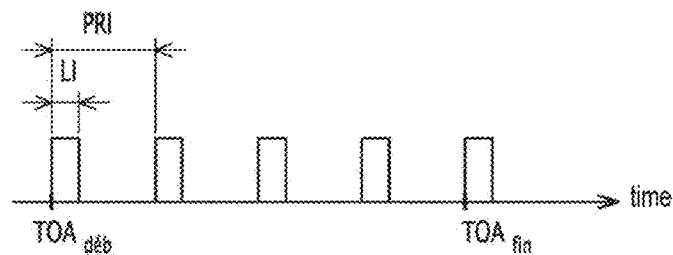
Figure 5:
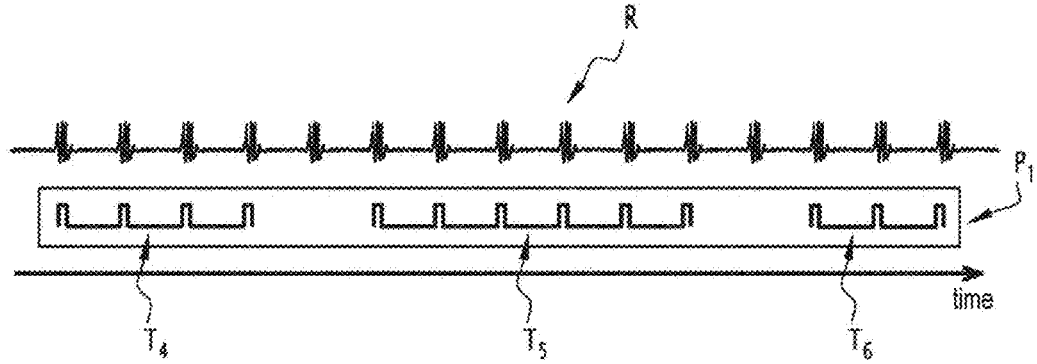
Figure 6:
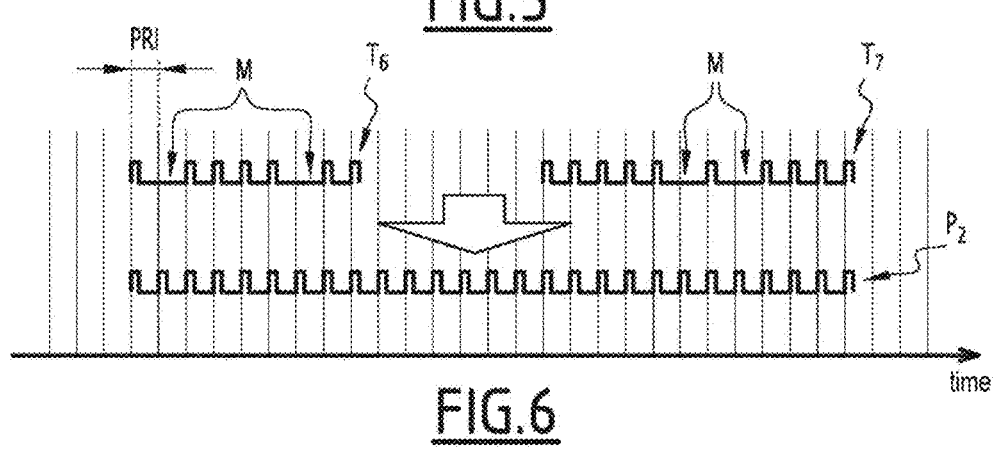
Figure 7:
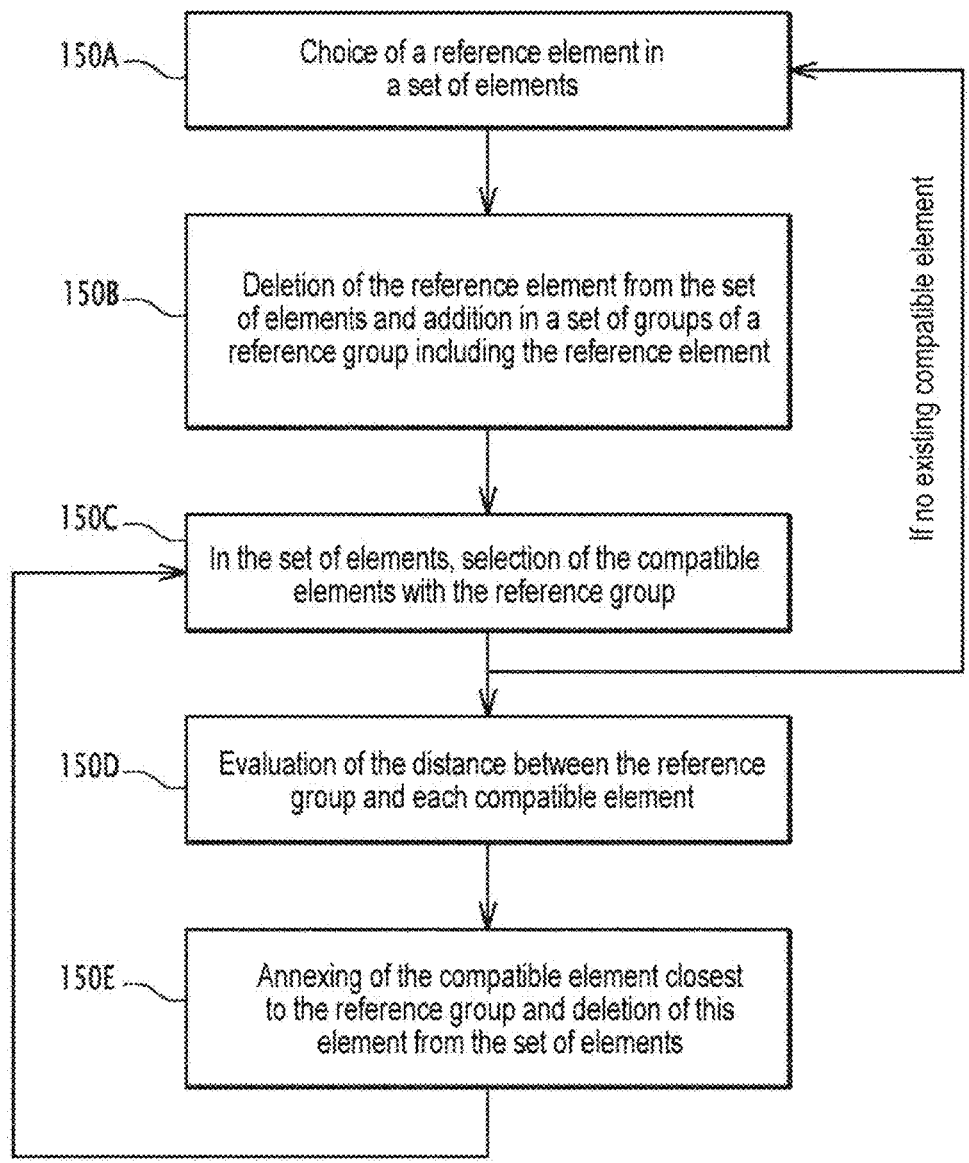
Figure 8:
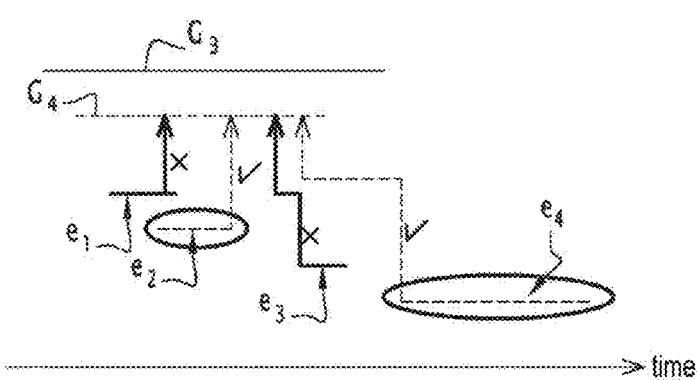
Figure 9:
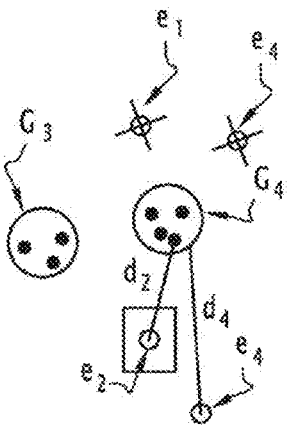
Figure 11:
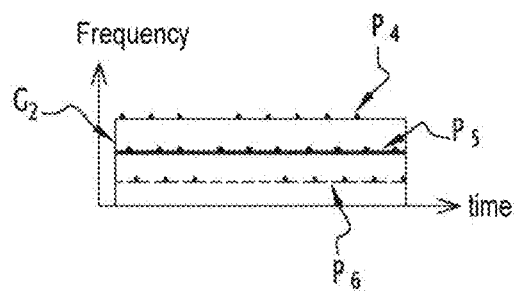
Figure 12:
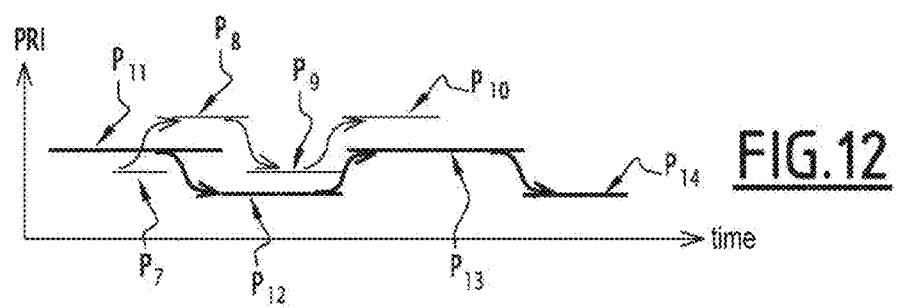
Figure 10:
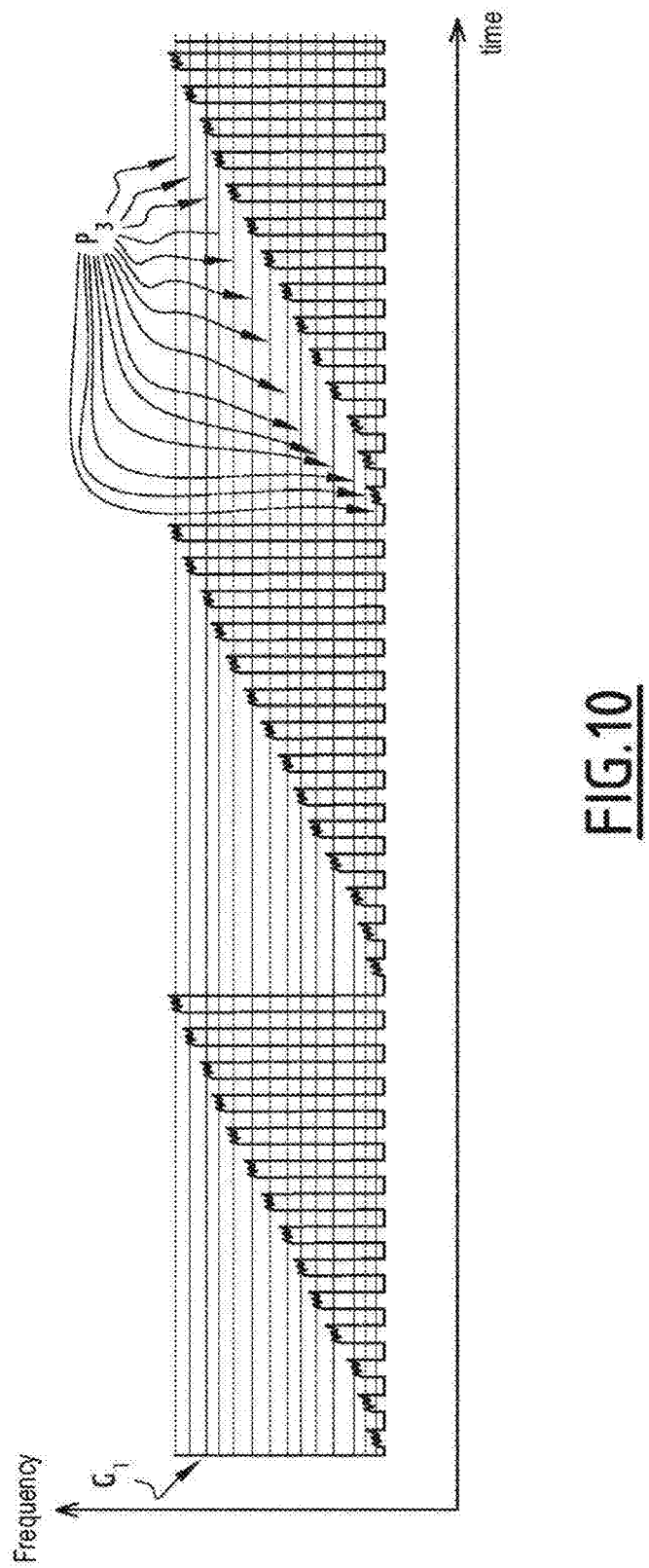

Other features and advantages of the invention will appear upon reading the following description of embodiments of the invention, solely as an example and done in reference to the drawings, which are:

FIG. 1, a schematic diagrammatic illustration of a device for deinterleaving radar signals allowing the implementation of a deinterleaving method according to the invention, FIG. 2, a flowchart of one example implementation of a deinterleaving method according to the invention, FIG. 3, a schematic illustration of three pulse trains, FIG. 4, a schematic illustration of a pulse train and properties defining this pulse train, FIG. 5, a schematic illustration of a signal and a pulse plateau resulting from the grouping of three pulse trains of this signal, FIG. 6, a schematic illustration showing the grouping of two pulse trains during a grouping step of the deinterleaving method according to the invention, FIG. 7, a flowchart of the operation of an algorithm implemented during the deinterleaving method according to the invention, FIG. 8, a schematic illustration of a phase for eliminating elements incompatible with a reference group, FIG. 9, a schematic illustration of a phase for uniting a compatible element with a reference group when the distance between the element and the reference group is minimal relative to the other compatible elements, FIG. 10, a schematic illustration of a group of pulse plateaus formed from pulse plateaus with a waveform of the FMICW type, FIG. 11, a schematic illustration showing the association of three pulse plateaus to form groups of pulse plateaus during another association step of the deinterleaving method according to the invention, FIG. 12, a schematic illustration showing the association of eight pulse plateaus to form two groups of pulse plateaus during an association step of the deinterleaving method according to the invention, and FIG. 13, a schematic illustration of the method for deinterleaving radar signals from the reception of the signals by a receiver until obtaining deinterleaved signals.

A device 10 for deinterleaving radar signals is shown in FIG. 1. The device 10 for deinterleaving radar signals is able to carry out a method for deinterleaving radar signals.

The input data of the deinterleaving device 10 are measurements of the features of the pulses received by the device 10. The features are for example the carrier frequency of the pulses, the width of the pulses, the power of the pulses, the arrival direction of the pulses, or the pulse repetition periods. Such feature pulse measurements for example come from:

the reception of radar signals by a receiver, then the digitization of the signals and the extraction of the pulses of the signals by a digital processing unit of the signal, the reception of analog signals created in a laboratory simulating the reception of radar signals, then the digitization of the signals and the extraction of the pulses of the signals by a digital processing unit of the signal, the generation, via software, of digital data simulating the reception and digitization of radar signals, and the extraction of the pulses of the signals by a digital processing unit of the signal, or the generation, via software, of pulses that are next recorded on a reception interface.

As illustrated in FIG. 1, the device 10 comprises an electromagnetic wave receiver 12, a computer 14 and a readable information medium 16 interacting with the computer 14.

The receiver 12 is able to receive electromagnetic signals, for example coming from radio detection systems such as radars. The electromagnetic signals for example come from radar transmitters or are analog signals created in the laboratory and simulating radar signals.

The radar 12 is connected to the computer 14 and is able to send the signals received by this receiver 12 to the computer 14.

The receiver 12 is for example an antenna. As an example, the receiver 12 is an elementary antenna, an array antenna, a reflector antenna, a circular polarization antenna, a waveguide antenna, an active antenna, a shortened antenna, a wide band antenna, a patch antenna, a loop antenna or a loop antenna, or a system made up of one or more of the preceding antennas.

The computer 14 is able to receive signals for example coming from the receiver 12 or digital data coming from simulation software.

The computer 14 is a computer comprising a processor 18, and optionally a man-machine interface 20 and a display unit 22.

The computer 14 further comprises a digital processing unit for the signal 23 and optionally an interface 32.

The processor 18 comprises a data processing unit 24, memories 26 and an information medium reader 28.

The information medium reader 28 is able to receive and read the readable information medium 16. The information medium reader 28 is connected to the data processing unit 24. The readable information medium 16 is a medium readable by the information medium reader 28. The readable information medium 16 is a medium suitable for storing electronic instructions and able to be coupled with a bus of a computer system. As an example, the readable information medium 16 is a floppy disk, an optical disc, a CD-ROM, a magnetic-optical disc, a ROM memory, a RAM memory, an EPROM (Erasable Programmable Read-Only Memory) memory, an EEPROM (Electrically-Erasable Programmable Read-Only Memory) memory, a magnetic card or an optical card.

A computer program product comprising program instructions is stored on the readable information medium 16. The computer program can be loaded on the data processing unit 24 and is suitable for driving the implementation of a method for deinterleaving radar signals according to the invention.

The man-machine interface 20 is for example a keyboard.

The display unit 22 is for example a monitor.

The digital processing unit for the signal 23 is configured to perform digital processing on the signals received by the computer 14. More specifically, the digital processing unit for the signal 23 is configured to digitize the received signals, extract the pulses from the signals, and measure the features of each extracted pulse.

Alternatively, the digital processing unit 23 is also configured to generate digital data simulating the reception and digitization of radar signals or to generate pulses directly.

The interface 32 makes it possible on the one hand to store pulses resulting from the digital processing of the signal done by the digital processing unit for the signal 23, and on the other hand to receive pulses stored beforehand or to receive pulses generated by simulation software.

The operation of the system for deinterleaving radar signals is now described in reference to FIG. 2, which is a flowchart of an example embodiment of a method for deinterleaving radar signals according to the invention.

The deinterleaving method comprises a step 100 for the reception of a plurality of electromagnetic signals by the receiver 12, digitization of the received signals, and extraction of electromagnetic pulses $I_1, \ldots, I_m$ from the signals digitized by digital processing of the signal. The digitization of the signals and the extraction of the pulses $I_1, \ldots, I_m$ are done by the digital processing unit for the signal 23 and are optionally stored in the interface 32. Such electromagnetic pulses $I_1, \ldots, I_m$ emanate from or are representative of, in particular, signals emitted by radio detection systems such as radars.

Alternatively, the pulses $I_1, \ldots, I_m$ are already stored in the interface 32.

The steps of the deinterleaving method described below are carried out by the computer 14 in interaction with the readable information medium 16.

The deinterleaving method next comprises a step 110 for forming pulse trains $T_1, \ldots, T_n$ from pulses $I_1, \ldots I_m$ received by the receiver 12 or stored in the interface 32.

During the formation step 110, at least three pulses $I_1, I_2, I_3$ are grouped together to form a pulse train $T_X$. The criterion for forming pulse trains $T_1, \ldots, T_n$ consists of grouping together, in a same pulse train $T_X$, the pulses $I_1, \ldots I_m$ having a same pulse repetition interval PRI. "Pulse repetition interval" refers to the period separating two consecutive pulses. In other words, the pulses $I_1, \ldots I_m$ grouped together in a same pulse train $T_X$ are such that any two consecutive pulses of the pulse train $T_X$ are spaced apart by a same pulse repetition interval PRI as any other two consecutive pulses of the pulse train $T_X$.

The formed pulse trains $T_1, \ldots T_n$ make up a set $E_T$ of pulse trains $T_1, \ldots, T_n$. The formed pulse trains $T_1, \ldots, T_n$ are defined by the pulse repetition interval PRI separating two consecutive pulses of the pulse train $T_1, \ldots, T_n$.

FIG. 3 shows three pulse trains $T_1, T_2$ and $T_3$ having pulse repetition intervals $PRI_1, PRI_2$ and $PRI_3$, potentially different from one another.

As illustrated in FIG. 4, a pulse train $T_X$ is also defined by the time of arrival of the first pulse $I_1$ of the pulse train $T_X$, called $TOA_{déb}$, and the time of arrival of the last pulse $I_m$ of the pulse train $T_X$, called $TOA_{fin}$.

Furthermore, each pulse train $T_X$ is optionally defined by at least one element chosen from a group made up of: the frequency of the pulses $I_1, \ldots, I_m$ of the pulse train $T_X$, the duration of the pulses $I_1, \ldots, I_m$ of the pulse train $T_X$, and the direction of arrival of the pulses $I_1, \ldots, I_m$ of the pulse train $T_X$.

The deinterleaving method next comprises a step 120 for rejecting inconsistent pulse trains $T_1, \ldots, T_n$.

The rejection step 120 verifies the pulse repetition interval PRI consistency of the pulse trains $T_1, \ldots, T_n$ formed during the formation step 110. Indeed, certain pulse trains $T_X$ may have been formed by mixing at least two pulse repetition intervals PRI that are close, but nevertheless different. A pulse train $T_X$ that is inconsistent in terms of pulse repetition interval PRI is for example detected using a statistical test based on the intervals separating all of the pulses of the train $T_X$. A chi-squared test may for example be used. The pulse trains $T_X$ that are deemed inconsistent in terms of pulse repetition interval PRI are eliminated from the set $E_T$ of pulse trains $T_1, \ldots, T_n$.

During this rejection step 120, optionally, the consistency of the pulse trains $T_1, \ldots, T_n$ in terms of carrier frequency of the pulses is also verified. "Carrier frequency of a pulse" refers to the carrier frequency of the pulse, the carrier being a wave modulated by an input signal. Indeed, certain pulse trains $T_X$ may have been formed by mixing at least two carrier frequencies that are close, but nevertheless different. A pulse train $T_X$ that is inconsistent in terms of carrier frequency is for example detected using a statistical test based on the pulse frequencies of the train $T_X$. A chi-squared test may for example be used. The pulse trains $T_X$ that are deemed inconsistent in terms of carrier frequency of the pulses are eliminated from the set $E_T$ of pulse trains $T_1, \ldots, T_n$.

If the pulse repetition intervals PRI, carrier frequencies of the pulses, respectively, are modeled as Gaussian variables that are independent of one another, the consistency in terms of pulse repetition interval PRI, carrier frequency of the pulse, respectively, is evaluated using a chi-squared statistical test. "Chi-squared test", abbreviated "$\chi 2$ test", or "khi2 test", is a statistical test making it possible to test the appropriateness of a series of data for a family of probability laws or to test the independence between two random variables.

The deinterleaving method next comprises a step 130 for rejecting inconsistent pulse trains $T_X$ not belonging to the category of high or medium recurrence frequency-type waveforms. A waveform groups together pulse trains $T_1, \ldots, T_n$ having shared features in particular in terms of pulse repetition interval PRI, carrier frequency of the pulses, and number of pulses. For example, the set of pulse trains $T_1, \ldots, T_n$ having short pulse repetition intervals PRI and a large number of pulses constitutes a waveform of the high or medium recurrence frequency type. Conversely, the set of pulse trains $T_1, \ldots, T_n$ having high pulse repetition intervals PRI and a small number of pulses constitutes another waveform of the low recurrence frequency type.

The rejection step 130 comprises defining feature thresholds of a waveform: a pulse repetition interval threshold $S_{PRI}$ and a number of pulses threshold $S_{impulsions}$.

The pulse repetition interval threshold $S_{PRI}$ and the number of pulses threshold $S_{impulsions}$ are defined from a database representative of a certain number of greater waveforms of interest. In one alternative embodiment, this waveform database is stored in the memory 26 of the processor 18. In another alternative embodiment, only the thresholds determined from the database are stored in the memory 26 of the processor 18.

The threshold $S_{PRI}$ is chosen to be greater than the value is primarily observed in the waveform database. The pulse repetition interval threshold $S_{PRI}$ is for example comprised, broadly speaking, between 1 microsecond (μs) and 1 millisecond (ms) to test whether it belongs to high or medium recurrence frequency waveforms.

The threshold $S_{impulsions}$ is chosen to be less than the value is primarily observed in the waveform database. The number of pulses threshold $S_{impulsions}$ is for example comprised, broadly speaking, between 1 pulse and 100 pulses to test whether it belongs to high or medium recurrence frequency waveforms. In this case, such pulse repetition $S_{PRI}$ and number of pulses $S_{impulsions}$ thresholds make it possible to exclude pulse trains $T_1, \ldots, T_n$ of the low recurrence frequency type.

The rejection step 130 next comprises rejecting pulse trains $T_1, \ldots, T_n$ for which the pulse repetition interval PRI is above the pulse repetition interval threshold $S_{PRI}$. The rejection step 130 also comprises rejecting pulse trains $T_1, \ldots, T_n$ for which the number of pulses is below the number of pulses threshold $S_{impulsions}$.

The pulse repetition interval threshold $S_{PRI}$ and the number of pulses threshold $S_{impulsions}$, thus forming a gauge such that any pulse train $T_X$ outside this gauge is rejected. Thus, the rejected pulse trains $T_X$ are removed from the set $E_T$ of pulse trains $T_1, \ldots, T_n$ and are subsequently processed using another specific deinterleaving method.

The deinterleaving method next comprises a step 140 for classifying the pulse trains $T_1, \ldots, T_n$.

The classification step 140 consists of sorting the pulse trains $T_1, \ldots, T_n$ of the set $E_T$ of pulse trains $T_1, \ldots, T_n$ according to the carrier frequency of the pulses of each pulse train $T_1, \ldots, T_n$.

During this classification step 140, the pulse trains $T_1, \ldots, T_n$ are distributed into two classes $C_1$, $C_2$ of pulse trains $T_1, \ldots, T_n$. The first class $C_1$ groups together the pulse trains $T_1, \ldots, T_n$ with a fixed carrier frequency, i.e., the pulse trains $T_1, \ldots, T_n$ made up of pulses having the same carrier frequency to within any measuring uncertainty. The measuring uncertainty is for example equal to plus or minus 5 percent (%) of the carrier frequency. The pulse trains $T_1, \ldots, T_n$ with a fixed carrier frequency are also called single-frequency pulse trains $T_1, \ldots, T_n$.

The second class $C_2$ of pulse trains $T_1, \ldots, T_n$ groups together the pulse trains $T_1, \ldots, T_n$ with a variable carrier frequency, i.e., the pulse trains $T_1, \ldots, T_n$ made up of pulses having different carrier frequencies. The pulse trains $T_1, \ldots, T_n$ with a variable carrier frequency are also called frequency agile pulse trains $T_1, \ldots, T_n$. The carrier frequency of the pulses of the frequency agile pulse trains $T_1, \ldots, T_n$ is generally random or pseudo-random.

The deinterleaving method next comprises a step 150 for grouping the pulse trains $T_1, \ldots, T_n$ of the set $E_T$ of pulse trains $T_1, \ldots, T_n$.

During the grouping step 150, the pulse trains $T_1, \ldots, T_n$ having a same pulse repetition interval PRI are grouped together according to at least one predefined grouping law in order to form pulse plateaus $P_1, \ldots, P_p$.

"Pulse plateau" refers to a set of pulses belonging to at least one pulse train formed during the grouping step 150.

FIG. 5 shows an example signal R received by the receiver 12 and a pulse plateau $P_1$ formed by grouping together pulse trains $T_4$, $T_5$ and $T_6$ of this signal. Likewise, FIG. 6 shows a pulse plateau $P_2$ resulting from the grouping together of pulse trains $T_6$ and $T_7$.

More specifically, the step 150 for grouping together pulse trains $T_1, \ldots, T_n$ is carried out, on the one hand, for the pulse trains $T_1, \ldots, T_n$ with a fixed carrier frequency during a first sub-step 160 for obtaining pulse plateaus $P_1, \ldots, P_p$ with a fixed carrier frequency. The grouping law used is called "fixed grouping law". Step 150 for grouping together pulse trains $T_1, \ldots, T_n$ is carried out, on the other hand, for the pulse trains $T_1, \ldots, T_n$ with a variable carrier frequency during a second sub-step 170 for obtaining pulse plateaus $P_1, \ldots, P_p$ with a variable carrier frequency. The grouping law used is called "variable grouping law".

The pulse trains $T_1, \ldots, T_n$ grouped together during the grouping step 150 have not been put together to form a single pulse train $T_1, \ldots, T_n$ during the formation step 110 because such pulse trains $T_1, \ldots, T_n$ for example had scattering M, i.e., missing pulses, for technical reasons. These technical reasons in particular depend on listening limitations of the receiver 12, the quality of the measurements by the digital processing unit for the signal 23, the proximity of the receiver 12 to the transmitter, the position of the receiver 12 relative to the transmitter, and electromagnetic disturbances.

The scattering is for example shown on pulse trains $T_6$ and $T_7$. The missing pulses are reconstituted during the formation of the pulse plateau $P_2$.

In general, a grouping law consists of an algorithm, the general structure of which is described in reference to FIG. 7.

Initially, the algorithm comprises a phase 150A for choosing a reference element $e_{réf}$ from among a set of elements E.

The algorithm next comprises a phase 150B for deleting the reference element $e_{réf}$ from the set of elements E and adding, in a set of groups $E_g$, a reference group $g_{réf}$ comprising the reference element $e_{réf}$.

The algorithm next comprises a phase 150C for selecting, in the set of elements E, elements compatible with the reference group $g_{réf}$ according to a set of criteria C. The elements compatible with the reference group $g_{réf}$ form a set of candidate elements $E_C$. The criteria C are for example chosen according to statistics on the features of radar waveforms from the waveform database.

For example, FIG. 8 illustrates a group $G_3$ that has already been formed and a group $G_4$ in formation, which is therefore, at this stage, the reference group $g_{réf}$ of the algorithm. The elements $e_1$, $e_2$, $e_3$ and $e_4$ are the elements of the set of elements E of the algorithm. As illustrated by a cross in this FIG. 8, the elements $e_1$ and $e_3$ are incompatible with the group $G_4$ in formation. Conversely, as illustrated by a checkmark in this FIG. 8, the elements $e_2$ and $e_4$ are compatible to be joined with the group $G_4$ in formation. The set of candidate elements $E_C$ of the algorithm therefore comprises two elements: $e_2$ and $e_4$.

The algorithm next comprises a phase 150D for evaluating the distance between the reference group $g_{réf}$ and each element of the set of candidate elements $E_C$.

Then, the algorithm comprises a phase 150E for annexing an element of the set of candidate elements $E_C$ to the reference group $g_{réf}$. The annexed element is removed from the set of elements E. The element from the set of candidate elements $E_C$ joined with the reference group $g_{réf}$ is the element having the smallest distance d. The expression "annexing an element to a group" refers to attaching the element to the group: at the end of the annexing, the final group is formed from the initial group and the annexed element, which is therefore joined with the initial group.

For example, FIG. 9 illustrates the determination of the element to be joined with the reference group $g_{réf}$, i.e., the group $G_4$ in formation, from among the set of candidate elements $E_C$. FIG. 9 comprises the same groups and elements as those of FIG. 8, but shown differently. Thus, the group $G_3$ already formed comprises three elements depicted by three circles. The group $G_4$ in formation already comprises four elements depicted by four circles. As shown in FIG. 9, the distance $d_2$ separating the element $e_2$ from the group $G_4$ is smaller than the distance $d_4$ separating the element $e_4$ from the group $G_4$. Consequently, the element from the set of candidate elements $E_C$ that minimizes the distance with the reference group $g_{réf}$ is the element $e_4$. The element $e_4$ will therefore be joined with the group $G_4$ in formation.

The phases for selecting compatible elements 150C, evaluating distances 150D and annexing 150E are next repeated with the remaining elements from the set of elements E, as long as the set of candidate elements $E_C$ calculated in the phase for selecting compatible elements 150C comprises elements.

Lastly, the choosing 150A, deletion and addition 150B, selection of compatible elements 150C, distance evaluation 150D and annexing 150E phases are repeated as long as the set of elements E comprises elements.

The fixed grouping law applied during the first sub-step 160 is described specifically below.

Each element of the algorithm is a pulse train $T_1, \ldots, T_n$ from the first class $C_1$ of pulse trains $T_1, \ldots, T_n$ having a fixed carrier frequency, and each group of the algorithm is a pulse plateau $P_1, \ldots, P_p$ with a fixed carrier frequency. The reference group $g_{réf}$ of the algorithm is a pulse plateau $P_1, \ldots, P_p$. Furthermore, the initial set of elements E of the algorithm is the set of pulse trains $T_1, \ldots, T_n$ from the first class $C_1$ of pulse trains $T_1, \ldots, T_n$ having a fixed carrier frequency.

During the choosing phase 150A, the element chosen from among the set of elements E is the element for which the time of arrival of the first pulse is smallest. In other words, the chosen element is the element from the set of elements E arriving first on the receiver 12, or the element saved on the interface 32 with the smallest time of arrival TOA of the first pulse.

The set of criteria C comprises the following criteria: a direction of arrival criterion, a temporal criterion, a frequency criterion, a pulse width criterion, a pulse repetition interval criterion and a phase criterion.

Only the elements of the set of elements E verifying all of the criteria from the set of criteria C are compatible with the reference group $g_{réf}$ and are added to the set of candidate elements $E_C$.

Alternatively, the set of criteria C does not comprise all of the stated criteria or comprises criteria different from those stated above.

The direction of arrival criterion makes it possible to test the compatibility of each element from the set of elements E with the reference group $g_{réf}$ as a function of their direction of arrival DOA. The direction of arrival criterion stipulates that in order to be compatible, the reference group $g_{réf}$ and the element must be made up of pulses having the same direction of arrival DOA.

The direction of arrival criterion is verified for an element from the set of elements E when the element verifies a comparison test for the directions of arrival DOA of the element and the reference group $g_{réf}$. The comparison test is based on a statistical model of the direction of arrival DOA and is suitable for taking into account the proportion of abnormal values. To verify the comparison test, the element from the set of elements E must verify the following equation $eq_1$:

$$(DOA_1 - DOA_2)^2 \leq 2 * \frac{\sigma^2}{1-2r} * \frac{\pi}{2} * \left(\frac{1}{n_1} + \frac{1}{n_2}\right) * \operatorname{erf}^{-1}(P(H_o \mid H_o))$$

where $DOA_1$ is the direction of arrival of the reference group $g_{réf}$, $DOA_2$ is the direction of arrival of the element from the set of elements E to be tested, $\sigma^2$ is the variance of the direction of arrival of the pulses, r is the proportion of deteriorated direction of arrival measurements, $n_1$ is the number of pulses present in the reference group $g_{réf}$, $n_2$ is the number of pulses present in the element from the set of elements E to be tested, erf$^{-1}$ is the reciprocal of the error function, the error function being given by the $$\mathrm{erf}(x) = \frac{2}{\sqrt{\pi}} \int_0^x e^{-t^2} dt,$$

and

P(H$_o$|H$_o$) is the likelihood of equality detection between DOA$_1$ and DOA$_2$, H$_O$ designating the hypothesis that the values DOA$_1$ and DOA$_2$ are equal, and P(H$_0$|H$_o$) designating the likelihood of making choice H$_o$, knowing that one is in case H$_O$.

Alternatively, another comparison test consists of calculating, then comparing, the mean direction of arrival DOA of the pulses in the reference group g$_{réf}$ with respect to the mean direction of arrival DOA of the pulses of each element from the set of elements E.

Alternatively, still another comparison test consists of calculating, then comparing, the median direction of arrival DOA of the pulses in the reference group g$_{réf}$ with respect to the median direction of arrival DOA of the pulses of each element from the set of elements E. Using the median and not the mean makes it possible to avoid taking abnormal data with a strong presence in the direction of arrival DOA measurements into account.

The temporal criterion makes it possible to test the temporal compatibility of each element from the set of elements E with the reference group g$_{réf}$. The temporal criterion stipulates that an element from the set of elements E that is superimposed in time with the reference group g$_{réf}$ is incompatible with the reference group g$_{réf}$. The temporal criterion further stipulates that an excessive time deviation between an element from the set of elements E and the reference group g$_{réf}$ also causes incompatibility of the element with the reference group g$_{réf}$. Indeed, a significant time deviation between the reference group g$_{réf}$ and the element can mean that no pulses were emitted. In this case, even if the reference group g$_{réf}$ and the element belong to the same transmitter, they are separate.

The maximum time deviation separating the reference group g$_{réf}$ from a compatible element of the set of elements E is for example a multiple of the mean pulse repetition interval PRI of the reference group g$_{réf}$. The maximum time deviation is for example equal to twenty times the mean value of the mean pulse repetition interval PRI of the reference group g$_{réf}$. The value of the multiple is determined empirically or from the waveform database. Alternatively, other values of multiples or other values of thresholds not depending on the pulse repetition interval PRI can also be considered.

The frequency criterion makes it possible to test the frequency compatibility of the elements from the set of elements E with the reference group g$_{réf}$. The frequency criterion stipulates that in order to be compatible, two elements must be made up of pulses having the same carrier frequency f. The frequency criterion is therefore verified for an element from the set of elements E when the element verifies a comparison test of the carrier frequencies of the pulses of the element with the carrier frequencies of the pulses of the reference group g$_{réf}$.

The comparison test consists of comparing the mean carrier frequency of the pulses in the reference group g$_{réf}$ with respect to the mean carrier frequency of the pulses of each element from the set of elements E. Such a comparison test is based on the fact that a frequency measurement follows a known Gaussian variance model. Nevertheless, in the case where the carrier frequency measurements are obtained using frequency windows, the possibilities for exclusion of certain frequency values must be anticipated. In this case, the distribution of the measured carrier frequencies is no longer Gaussian, since it is partially truncated, and the comparison of the means is then biased.

Alternatively, in particular in the case where the distribution of the frequencies is no longer Gaussian, a X$^2$ test is used. To verify the frequency criterion, the element from the set of elements E must verify the following equation eq$_2$:

$$\sum_{i=0}^{n_1} f_{1,i}^2 + \sum_{i=0}^{n_2} f_{2,i}^2 - \frac{\left(\sum f_{1,i}^2 + \sum f_{2,i}^2\right)^2}{n_1 + n_2} \leq \sigma_f^2 * \chi_{n_1+n_2-1, P(H_o|H_o)}^2$$

where f$_{1,i}$ is the carrier frequency of the pulse of order i of the reference group g$_{réf}$, f$_{2,i}$ is carrier frequency of the pulse of order i of the element from the set of elements E to be compared, n$_1$ is the number of pulses of the reference group g$_{réf}$, n$_2$ is the number of pulses of the element from the set of elements E to be compared, σ$_f^2$ is the variance of the distribution of the carrier frequency measurements of the pulses, $\chi_{v,p}^2$ is the quantile x$_p$ for the likelihood p of the distribution of the khi2 with vdegrees of freedom, i.e., if a random variable X follows a khi2 law with vdegrees of freedom, the probability of having X≤x$_p$ is p, and P(H$_o$|H$_o$) is the likelihood of equality detection between $\Sigma_{i=0}^{n_1} f_{1,i}^2$ and $\Sigma_{i=0}^{n_2} f_{2,i}^2$, H$_O$ designating the hypothesis that the two values frequency are equal, and P(H$_o$|H$_o$) designating the likelihood of making choice H$_O$, knowing that one is in case H$_O$.

The pulse width criterion makes it possible to test the pulse width compatibility LI of the elements from the set of elements E with the reference group g$_{réf}$. The pulse width criterion stipulates that in order to be compatible, the reference group g$_{réf}$ and the element must be made up of pulses having the same pulse width. As illustrated in FIG. 4, the pulse width LI of a pulse is the duration of the pulse.

The pulse width criterion is verified for an element from the set of elements E when the pulse widths LI of the pulses of the element are of the same order of magnitude as the pulse widths LI of the pulses of the reference group g$_{réf}$. "Same order of magnitude" refers to a relative deviation below a threshold determined from the waveform database, or for example equal to 50%.

The pulse repetition interval PRI criterion makes it possible to test the compatibility of the pulse repetition interval PRI of each element from the set of elements E with the reference group g$_{réf}$. The pulse repetition interval PRI criterion stipulates that the pulses of each element from a same group must have the same pulse repetition interval PRI. The pulse repetition interval PRI criterion is verified for an element from the set of elements E when the element verifies a comparison test of the pulse repetition interval PRI of the element with the pulse repetition interval PRI of the reference group g$_{réf}$.

The comparison test first consists of estimating, for each element from the set of elements E, the theoretical pulse repetition interval PRI resulting from the union of the pulses of the element with the pulses of the reference group g$_{réf}$. The theoretical pulse repetition interval PRI is for example estimated using the Fourier method or the least-squares method. The comparison test next consists of performing a goodness-of-fit test to verify, for example, whether the sum of the quadratic errors is above or below a threshold. The goodness-of-fit test is for example a $X^2$ test. This comparison test furthermore has the advantage of determining the pulse repetition interval PRI of the obtained group when the element from the set of elements E is joined with the reference group $g_{réf}$. However, such a comparison test is relatively slow and resource-heavy.

Alternatively, a shorter and less resource-heavy comparison test is described. To verify the pulse repetition interval PRI criterion, the element from the set of elements E must verify the following equation $eq_3$:

$$(PRI_1 - PRI_2)^2 \lesseqgtr 4 * \sigma_{TOA}^2 * (erf^{-1}(P_d))^2$$

where $PRI_1$ is the pulse repetition interval of the reference group $g_{réf}$, $PRI_2$ is the pulse repetition interval of the element from the set of elements E to be compared, $\sigma_{TOA}^2$ is the variance of the distribution of the time of arrival TOA measurements of the pulses, $erf^{-1}$ is the reciprocal of the error function, and $P_d$ is the likelihood of detecting equality of two PRI values.

Alternatively, if the provisions of the pulse repetition intervals of each element have been estimated, still another test is proposed. To verify the pulse repetition interval PRI criterion, the element from the set of elements E must verify the following equation $eq_4$:

$$(PRI_1 - PRI_2)^2 \lesseqgtr 2 * (var(PRI_1) + var(PRI_2)) * (erf^{-1}(P_d))^2$$

where $var(PRI_1)$ is variance of the pulse repetition interval of the reference group $g_{réf}$, $var(PRI_2)$ is the variance of the pulse repetition interval of the element from the set of elements E to be compared, and the other notations are those of equation $eq_3$.

The pulse repetition interval criterion also accounts for the fact that certain plateaus may have missing pulses, and that consequently, the measured pulse repetition interval PRI may be a multiple of the actual pulse repetition interval PRI.

Thus, the pulse repetition interval PRI criterion also compares the multiples of the pulse repetition intervals of each element from the set of elements E with the pulse repetition interval PRI of the reference group $g_{réf}$, and vice versa. For example, the comparison test compares the pulse repetition interval PRI of the reference group $g_{réf}$ with two times, three times, four times, respectively, the pulse repetition interval PRI of each element from the set of elements E or the pulse repetition interval PRI of each element from the set of elements E with two times, three times, four times, respectively, the pulse repetition interval PRI of the reference group $g_{réf}$. The number of multiples to be compared depends on the listening conditions and the scattering percentage M of the elements. Nevertheless, three is a reasonable multiple limit. It is indeed relatively unlikely that a scattered element will retain one pulse out of four at regular intervals.

The phase criterion makes it possible to test the phase compatibility of the times of arrival of the pulses of each element from the set of elements E with the reference group $g_{réf}$.

The phases in time of arrival of the pulses of two elements have been calculated beforehand relative to a reference time $t_{ref}$. However, if the reference time $t_{ref}$ is far from the temporal position of the elements to be compared, this may prove problematic for the comparison. From a mathematical perspective, the precision of the phase in time of arrival of the pulses is obtained using the least-squares method or the Fourier method. The precision of the phase in time of arrival of the pulses verifies the following equation $eq_5$:

$$var\hat{\varphi} = \frac{\sum k_i^2}{n \sum k_i^2 - (\sum k_i)^2} * \sigma_{TOA}^2$$

where $\hat{\varphi}$ is the estimate of the phase as a function of the time of arrival of the pulses, $k_i$ is the rank or order of the pulse i relative to the zero time such that $$k_i = \left[ \frac{t_i + \frac{1}{2}}{PRI} \right]$$

with $t_i$ the time of arrival of the pulse i and PRI the repetition interval of the pulses and [ ] designating the entire part, n is the number of pulses of the obtained group, and $\sigma_{TOA}^2$ is the variance of the distribution of the time of arrival TOA measurements of the pulses.

From $eq_5$, it is possible to show that the precision of the phase is better, i.e., smaller, when the orders of the pulses are low, i.e., when the reference time $t_{ref}$ is close to the temporal position of the element.

The phase criterion assumes that the two elements to be compared first verify the pulse repetition interval PRI criterion. If this is not the case, the reference group $g_{réf}$ and the element are incompatible in phase. The phase criterion is verified for an element from the set of elements E when the element verifies a comparison test for the phases of the element and the reference group $g_{réf}$.

The comparison test first comprises the determination of a new reference time $t_{ref}$, which will be positioned at the center of the temporal position of the two elements to be compared. The comparison test next comprises calculating phases of the reference group $g_{réf}$ and the element in this new reference time $t_{ref}$. Lastly, the element from the set of elements E is compatible with the reference group $g_{réf}$ when it verifies the following equation $eq_6$:

$$(\varphi'_{toa,1} - \varphi'_{toa,2})^2 \lesseqgtr 2(var(\hat{\varphi}'_{toa,1}) + var(\hat{\varphi}'_{toa,2})) * (erf^{-1}(P(H_0|H_0)))^2$$

where $\varphi'_{toa,1} = (\varphi_{toa,1} - t_{ref}) * mod(PRI_1)$
and $\varphi'_{toa,2} = (\varphi_{toa,2} - t_{ref}) * mod(PRI_2)$,
where $$t_{ref} = \frac{toa_{fin,1} + toa_{deb,2}}{2}$$

is the mean between the time of arrival of the last pulse of the reference group $g_{réf}$ and the time of arrival of the first pulse of the element from the set of elements E to be compared, (x)mod(y) indicates that a modulo is calculated by subtracting y as many times as necessary from x in order for (x)mod(y) to be comprised between 0 and y, $\varphi_{toa,1}$ is the phase in time of arrival TOA of the pulses of the reference group $g_{réf}$, $\varphi_{toa,2}$ is the phase in time of arrival TOA of the pulses of the elements from the set of elements E to be compared, var designates the variance, where $erf^{-1}$ is the reciprocal of the error function, and where $P(H_o|H_o)$ is the likelihood of equality detection between the phases, $H_O$ designating the hypothesis that the phases d $P(H_o|H_o)$ designating the likelihood of making choice $H_O$, knowing that one is in case $H_O$.

Also alternatively, in particular when the variance data are not accessible, the element from the set of elements E is declared compatible with the reference group $g_{réf}$ when it verifies the following equation $eq_7$:

$$|\varphi'_{toa,1} - \varphi'_{toa,2}| \lesssim 2*\sigma_{10a}*\text{erf}^{-1}(P(H_0|H_0))$$

where the notations are identical to the notations from equations $eq_5$ and $eq_6$.

Only the elements of the set of elements E verifying all of the criteria from the set of criteria C are compatible with the reference group $g_{réf}$. Having at least two elements compatible with the reference group $g_{réf}$ occurs infrequently. However, if this occurs, the distance d is the time deviation separating the last pulse $I_m$ of the reference group $g_{réf}$ from the first pulse $I_1$ of the candidate element from the set of candidate elements $E_C$. The element joined with the reference group $g_{réf}$ is then the element that minimizes the distance d, i.e., the element for which the time deviation between the first pulse $I_1$ of the element and the last pulse of the reference group $g_{réf}$ is minimal.

When an element of the set of candidate elements $E_C$ is annexed to the reference group $g_{réf}$, the feature data of the obtained group are updated.

Thus, the time of arrival of the first pulse of the obtained group is the minimum of the time of arrival of the first pulse of the reference group $g_{réf}$ and the annexed element. The time of arrival of the last pulse of the obtained group is the maximum of the times of arrival of the last pulse of the reference group $g_{réf}$ and the annexed element.

The direction of arrival DOA of the obtained group is the mean of the directions of arrival of the reference group $g_{réf}$ and the annexed element.

The carrier frequency of the obtained group is given by the following equation $eq_8$:

$$f_{group} = \frac{N_1 * f_1 + N_2 * f_2}{N_1 + N_2}$$

where $f_{group}$ designates the carrier frequency of the obtained group, $N_1$ designates the number of pulses of the reference group $g_{réf}$, $f_1$ designates the carrier frequency of the reference group $g_{réf}$, $f_2$ designates the carrier frequency of the annexed element, and $N_2$ designates the number of pulses of the annexed element.

The sum of the carrier frequencies of the obtained group is the addition of the sum of the carrier frequencies of the reference group $g_{réf}$ and the sum of the carrier frequencies of the annexed element. The sum of the carrier frequencies squared of the obtained group is the addition of the sum of the carrier frequencies squared of the reference group $g_{réf}$ and the sum of the carrier frequencies squared of the annexed element.

The number of pulses of the obtained group is the sum of the number of pulses of the reference group $g_{réf}$ and the number of pulses of the annexed element.

The pulse width LI of the obtained group is given by the following equation $eq_9$:

$$LI_{group} = \frac{N_1 * LI_1 + N_2 * LI_2}{N_1 + N_2}$$

where $LI_{groupe}$ designates the pulse width LI of the obtained group, $N_1$ designates the number of pulses of the reference group $g_{réf}$, $LI_1$ designates the pulse width LI of the reference group $g_{réf}$, $LI_2$ designates the pulse width LI of the annexed element, and $N_2$ designates the number of pulses of the annexed element.

The pulse repetition interval PRI of the obtained group is obtained using linear regression by a least squares criterion over all of the pulses of the new group. This linear regression is given by the following equation $eq_{10}$:

$$\widehat{PRI} = \frac{\sum_i \left( k_i t_i - t_i \sum_r \left(\frac{k_r}{n}\right) \right)}{\sum k_i^2 - \frac{(\sum k_i)^2}{n}}$$

with $k_i$ the order number of the pulses, $t_i$ the time of arrival of the pulses and n the number of pulses of the obtained group.

Alternatively, an approximation of the pulse repetition interval PRI is calculated assuming the estimates of the pulse repetition interval PRI of the reference group $g_{réf}$ and the pulse repetition interval PRI of the annexed element to be independent of one another. The approximation first consists of correcting the pulse repetition intervals PRI of the elements of the group and the pulse repetition interval PRI variances of the elements of the group when the pulse repetition interval PRI of one of the elements of the group is a multiple of the pulse repetition interval PRI of the other elements of the group. For example, if the pulse repetition interval PRI of the reference group $g_{réf}$ is equal to two times the pulse repetition interval PRI of the annexed element, the pulse repetition interval PRI of the reference group $g_{réf}$ is divided by two and the pulse repetition interval PRI variance of the reference group $g_{réf}$ is divided by four. Next, the pulse repetition interval PRI of the obtained group is calculated from the following equation $eq_{11}$:

$$\widehat{PRI} = \frac{\text{var}(\widehat{PRI}_2) * \widehat{PRI}_1 + \text{var}(\widehat{PRI}_1) * \widehat{PRI}_2}{\text{var}(\widehat{PRI}_1) + \text{var}(\widehat{PRI}_2)}$$

where $\widehat{PR}I$ is the estimate of the pulse repetition interval of the obtained group, $\widehat{PR}I_1$ is the estimate of the pulse repetition interval of the reference group $g_{réf}$, var $(\widehat{PR}I_1)$ is the variance of $\widehat{PR}I_1$, $\widehat{PR}I_2$ is the estimate of the pulse repetition interval of the annexed element, and var $(\widehat{PR}I_2)$ is the variance of $\widehat{PR}I_2$.

Furthermore, the variance of the estimate of the pulse repetition interval PRI obtained with equation $eq_{11}$ verifies the following equation $eq_{12}$:

$$\text{var}(\widehat{PRI}) = \frac{\text{var}(\widehat{PRI}_1) * \text{var}(\widehat{PRI}_2)}{\text{var}(\widehat{PRI}_1) + \text{var}(\widehat{PRI}_2)}$$

where var(PRI) is the variance of the estimate of the pulse repetition interval of the obtained group and the other notations are identical to those equation $eq_{11}$.

Alternatively, in the case where the variances of the pulse repetition intervals PRI have not been estimated for each element of the obtained group, another pulse repetition interval PRI calculation consists of correcting the multiple pulse repetition intervals, like in the preceding alternative, and calculating the estimate of the pulse repetition interval PRI of the obtained group by using the following equation $eq_{13}$:

$$\widehat{PRI} = \frac{TOA_{fin} - TOA_{deb}}{\left(\frac{TOA_{fin} - TOA_{deb}}{\widehat{PRI}_1} + \frac{1}{2}\right)}$$

where $TOA_{deb}$ is the time of arrival of the first pulse of the obtained group, $TOA_{fin}$ is the time of arrival of the last pulse of the obtained group, and the other notations are identical to the notations of equation $eq_{11}$.

The variance of the estimate of the pulse repetition interval PRI obtained with equation $eq_{13}$ verifies the following equation $eq_{14}$:

$$\text{var}(\widehat{PRI}) = 2 * \frac{\sigma_{TOA}^2}{\left(\frac{TOA_{fin} - TOA_{deb}}{\widehat{PRI}_1} + \frac{1}{2}\right)^2}$$

where $\sigma_{TOA}^2$ is the variance of the measurement of the time of arrival of the pulses, and the other notations are identical to the notations of equation $eq_{13}$.

The phase in time of arrival TOA of the pulses of the obtained group is calculated after the following steps. First, a new reference time $t_{ref}$ is taken, centered between the first element and the second element forming the group. Then, the phases of each of the elements forming the group are calculated with this new reference time $t_{ref}$. Next, the phase of the group obtained relative to this reference time $t_{ref}$ verifies the following equation $eq_{15}$:

$$\varphi'_{TOA} = \frac{N_1 * \varphi'_{TOA,1} + N_2 * \varphi'_{TOA,1}}{N_1 + N_2}$$

where $\varphi'_{TOA}$ is the phase in time of arrival of the pulses of the obtained group calculated relative to a reference time $t_{ref}$, $\sigma'_{TOA,1}$ is the phase of the reference group $g_{réf}$ recalculated relative to a reference time $t_{ref}$, $N_1$ is the number of pulses of the reference group $g_{réf}$, and $N_2$ is the number of pulses of the annexed element.

Lastly, the phase of the obtained group calculated relative to an original time verifies the following equation $eq_{16}$:

$$\varphi_{TOA} = (\varphi'_{TOA} + t_{ref}) * \text{mod}(\widehat{PRI})$$

where $\varphi_{TOA}$ is the phase in time of arrival of the pulses of the obtained group calculated
relative to the original time, (x)mod(y) designates the modulo, like in equation $eq_6$, $t_{ref}$ is the reference time relative to which the phase $\varphi'_{TOA}$ was calculated, $\widehat{PRI}$ is the estimate of the pulse repetition interval of the obtained group, and the other notations are identical to the notations of equation $eq_{15}$.

The original time is the reception time of the first pulse on the receiver 12 or the shortest time of the pulses recorded on the interface 32.

The variable grouping law applied during the second sub-step 170 is described specifically below.

Each element of the algorithm is a pulse train $T_1, \ldots, T_n$ from the second class $C_2$ of pulse trains $T_1, \ldots, T_n$ having a variable carrier frequency, and each group of the algorithm is a pulse plateau $P_1, \ldots, P_p$ with a variable carrier frequency. Furthermore, the set of elements E of the algorithm is the set of pulse trains $T_1, \ldots, T_n$ from the second class $C_2$ of pulse trains $T_1, \ldots, T_n$ having a variable carrier frequency.

Below, only the differences of the second sub-step 170 relative to the first sub-step 160 are highlighted.

The frequency criterion stipulates that the difference between the maximum carrier frequency of the pulses of an element and the minimum carrier frequency of the pulses of the element must be below a threshold. This threshold is related to the technological limitations of frequency scanning by the radar transmitters of interest. This threshold is chosen according to the statistics on the waveforms from the database used. This threshold is for example comprised, broadly speaking, between 100 Megahertz (MHz) and 10 Gigahertz (GHz).

The deinterleaving method next comprises a step 180 for associating pulse plateaus $P_1, \ldots, P_p$ by overlapping according to an association law.

During the association step by overlapping 180, the pulse plateaus $P_1, \ldots, P_p$ having a same pulse repetition interval PRI and that are superimposed in time are grouped together to form groups of pulse plateaus $G_1, \ldots, G_g$ with overlapping.

More specifically, the step 180 for associating pulse plateaus $P_1, \ldots, P_p$ with overlapping is carried out, only for the pulse plateaus $P_1, \ldots, P_p$ with a fixed carrier frequency obtained during the grouping step 150.

The association step with overlapping 180 in particular makes it possible to group together frequency modulated interrupted continuous wave (FMICW) forms. The FMICW waves are formed by pulses spaced apart by a same pulse repetition interval PRI and the carrier frequency of which increases continuously over time during a given duration. The frequency profile of a FMICW wave is illustrated as a function of time in FIG. 10. The pulses of the same frequency and having the same pulse repetition interval PRI form a pulse train or a pulse plateau.

As shown in FIG. 10, each pulse belongs to a pulse plateau $P_3$. The pulses of a same pulse plateau $P_3$ have the same frequency. The pulse plateaus $P_3$ of FIG. 10 have not been grouped together to form a single pulse plateau during the grouping step 150, since the temporal criterion of the grouping step 150 eliminates the elements that are superimposed in time. Yet the pulse plateaus or pulse trains of a FMICW wave are superimposed in time. The association by overlapping step 180 therefore makes it possible, in the case of FMICW waves, to assemble pulse plateaus superimposed in time so as to reconstruct a FMICW signal. Thus, in this FIG. 10, the assembly of the pulse plateaus $P_3$ makes it possible form a group of pulse plateaus $G_1$.

The association law used to associate the pulse plateaus $P_1, \ldots, P_p$ with a fixed carrier frequency with overlapping is subsequently called "overlapping association law".

The overlapping association law is implemented by an algorithm with the same general structure as the general structure of the algorithm of the fixed overlapping law described in the grouping step 150.

Each element of the algorithm is a pulse plateau $P_1, \ldots, P_p$ having a fixed carrier frequency and each group of the algorithm is a group of pulse plateaus $G_1, \ldots, G_g$ with overlapping. The reference group $g_{réf}$ of the algorithm is a group of pulse plateaus $G_1, \ldots, G_g$. Furthermore, the set of elements E of the algorithm is the set of pulse plateaus $P_1, \ldots, P_p$ having a fixed carrier frequency.

Hereinafter, the features of the overlapping association law that are identical to the features of the fixed grouping law are not described again. Only the difference of the overlapping association law relative to the fixed grouping law are described below.

The temporal criterion stipulates that in order to be compatible, two elements must be superimposed in time.

When the reference group $g_{réf}$ is a group of pulse plateaus, the frequency criterion is identical to the frequency criterion of the second sub-step 170 of the grouping step 150. In this case, the phase criterion is not applied. Indeed, there is no constraint on the phases in time of arrival of the pulses at the plateau groups.

When the reference group $g_{réf}$ is a pulse plateau $P_1, \ldots, P_p$, the phase criterion is identical to the phase criterion of the first sub-step 160 of the grouping step 150. In this case, if the phase criterion is verified and if the direction of arrival, temporal, pulse width and pulse repetition interval criteria are also verified, the frequency criterion is evaluated according to two scenarios.

In the first scenario, the carrier frequencies of the pulses of the two pulse plateaus $P_1, \ldots, P_p$ to be compared are identical and the theoretical number of pulses of the two joined plateaus is greater than or equal to the actual number of pulses of the two joined pulse plateaus $P_1, \ldots, P_p$. In this first scenario, the two plateaus are compatible.

In the second scenario, the carrier frequencies of the pulses of the two pulse plateaus $P_1, \ldots, P_p$ to be compared are different or the theoretical number of pulses of the two joined plateaus is lower than the actual number of pulses of the two joined pulse plateaus $P_1, \ldots, P_p$. In this second scenario, the two plateaus are incompatible.

Between several compatible elements to be joined with a reference group $g_{réf}$, the association with overlapping step 180 gives priority to the element whose phase is already present in the reference group $g_{réf}$. This first priority rule makes it possible first to join burst pulse plateaus $P_1, \ldots, P_p$ with a same pulse repetition interval PRI. Furthermore, if a group corresponding to a FMICW is already in formation, a second priority rule applies. According to this second priority rule, the information for the plateaus already present in the group corresponding to a FMICW is consolidated, before adding a new pulse plateau $P_1, \ldots, P_p$ to the group.

Once the priority rules are applied, preference is given to the compatible element that has the best overlap rate with the reference group $g_{réf}$. The overlap rate is given by the following equation $eq_{17}$:

$$overlap_{rate} = \frac{\Delta T_{overlap}}{Min(\Delta T_1, \Delta T_2)}$$

where $overlap_{rate}$ is the overlap rate between a first element and a second element, this overlap rate being comprised between 0 and 100%

$\Delta T_{overlap}$ is the temporal deviation between the reception time of the first pulse of the compatible element and the reception time of the last pulse of the reference group $g_{réf}$, $\Delta T_1$ is the duration of the reference group $g_{réf}$, $\Delta T_2$ is the duration of the compatible element, and $Min(\Delta T_1, \Delta T_2)$ is the minimum of $\Delta T_1$ and $\Delta T_2$.

The distance d that must be minimized by an element from a set of candidate elements to be joined to the reference group $g_{réf}$ is given by the following equation $eq_{18}$:

$$d = a + (1 - \text{taux}_{rate})$$

where a assumes the value zero if the phases are equal, and assumes the value 1 if the phases are not equal, the other notations being identical to the notations of equation $eq_{17}$.

The choice of such a distance d makes it possible to join the element that causes an explication rate to increase as quickly as possible to the reference group $g_{réf}$. The explication rate of a group is the ratio of the number of actual pulses of the group to the number of theoretical pulses of the group.

When an element is annexed to the reference group $g_{réf}$, the features of the group obtained in terms of direction of arrival DOA of the pulses, time of arrival of the first pulse, time of arrival of the last pulse, frequency of the pulses, number of pulses, pulse repetition interval PRI, pulse width LI, phase in time of arrival of the pulses are updated by proceeding in the same manner as during the first sub-step 160 of the grouping step 150.

The deinterleaving method next comprises a step 190 for associating pulse plateaus by switching.

During the association step by switching 190, the pulse plateaus $P_1, \ldots, P_p$ having a different pulse repetition interval PRI and that are linked in time are grouped together according to at least one predefined association law to form groups of pulse plateaus $G_1, \ldots, G_g$ with switching.

For example, as illustrated in FIG. 12, the pulse plateaus $P_7, P_8, P_9$ and $P_{10}$ are connected by arrows in thin lines to form a group of pulse plateaus $G_1, G_g$ with switching. Likewise, the pulse plateaus $P_{11}, P_{12}, P_{13}$ and $P_{14}$ are connected by arrows in thick lines to form another group of pulse plateaus $G_1, G_g$ with switching. As shown in this FIG. 12, each group of plateaus $G_1, \ldots, G_g$ is formed by plateaus that are not superimposed in time and that have different pulse repetition intervals PRI.

More specifically, the step 190 for associating pulse plateaus $P_1, \ldots, P_p$ with switching is carried out, on the one hand, during a first sub-step 200, for the pulse plateaus $P_1, \ldots, P_p$ with a fixed carrier frequency not having been grouped together during the association with overlapping step 180. At the end of this first sub-step 200, groups of pulse plateaus $G_1, \ldots, G_g$ with overlapping having a fixed carrier frequency are obtained. In this case, the association law implemented is called "fixed switching association law".

Step 190 for the association with switching of the pulse plateaus $P_1, \ldots, P_p$ is carried out, on the other hand, for the pulse plateaus $P_1, \ldots, P_p$ with a variable carrier frequency during a second sub-step 210 for obtaining groups of pulse plateaus $G_1, \ldots, G_g$ with switching have a variable carrier frequency. In this case, the association law implemented is called "variable switching association law".

Each of the switching association laws is implemented by an algorithm whose general structure is identical to the general structure of the algorithm described in the grouping step 150.

Each element of the algorithm is a pulse plateau $P_1, \ldots, P_p$ and each group of the algorithm is a group of pulse plateaus $G_1, \ldots, G_g$. The reference group $g_{réf}$ is a group of pulse plateaus $G_1, \ldots, G_g$.

Hereinafter, the features of the fixed switching association law that are identical to the features of the fixed grouping law are not described again. Only the difference of the fixed switching association law relative to the fixed grouping law are described below.

Each element of the algorithm is a pulse plateau $P_1, \ldots, P_p$ having a variable carrier frequency not having been joined during the association with overlapping step 180. Each group of the algorithm is a group of pulse plateaus $G_1, \ldots, G_g$ with fixed carrier frequency switching. Furthermore, the set of elements E of the algorithm is the set of pulse plateaus $P_1, \ldots, P_p$ having a fixed carrier frequency not having been joined during the grouping step 150.

The pulse width criterion makes it possible to determine the plateaus having close pulse widths LI or close shape factors. The shape factor of a plateau is defined as the ratio between the pulse width LI of the plateau and the pulse repetition interval PRI. Indeed, the observation of specific waveforms, in particular waveforms with a high recurrence frequency and medium recurrence frequency, shows a constant in the values of the pulse width of a same signal and/or the values of the shape factors of the plateaus of a same signal. The pulse width LI measurements being relatively unreliable, the pulse width criterion consists of a comparison test of the orders of magnitude of the pulse widths of two elements or shape factors of two elements.

The pulse repetition interval PRI criterion makes it possible to determine the plateaus having close pulse repetition intervals. Indeed, observing different waveforms makes it possible to define an upper boundary in the pulse repetition interval deviations of the plateaus of a same signal. Indeed, for a same signal, the pulse repetition intervals of the different plateaus forming the signal must not be spaced apart by more than a certain threshold value. Consequently, two plateaus are compatible when the pulse repetition intervals PRI of each of the two plateaus verify the following equation $eq_{19}$:

$$\frac{\text{Max}(PRI_1, PRI_2) - \text{Min}(PRI_1, PRI_2)}{\text{Max}(PRI_1, PRI_2) + \text{Min}(PRI_1, PRI_2)} < S_1$$

where $PRI_1$ is the pulse repetition interval of the reference group $g_{réf}$, $PRI_2$ is the pulse repetition interval of the annexed element, $\text{Max}(PRI_1, PRI_2)$ is the maximum of $PRI_1$ and $PRI_2$, $\text{Min}(PRI_1, PRI_2)$ is the minimum of $PRI_1$ and $PRI_2$, and $S_1$ is a relative deviation threshold chosen according to the waveforms from the database used, or for example equal to 60%.

Equation $eq_{19}$ is valid for waveforms of the high and medium recurrence frequency type.

The frequency criterion makes it possible to determine the plateaus having close carrier frequencies. Indeed, observing different waveforms makes it possible to posit an upper boundary in the carrier frequency deviations of the plateaus of a same signal. Such an upper boundary is related to the technological limits of the transmitters. According to the frequency criterion, two compatible elements each first verify the following equation $eq_{20}$:

$$\frac{|f_1 - f_{moy}|}{f_1 + f_{moy}} < S_2$$

where $f_1$ is the carrier frequency of one of the elements to be tested, $f_{moy}$ is the mean of the carrier frequency is derived from joining two elements to be tested, and $S_2$ is a relative deviation threshold chosen according to the waveforms from the database used, or for example equal to 10%.

Furthermore, according to the frequency criterion, two compatible elements also each verify the following equation $eq_{21}$:

$$|f_1 - f_{moy}| < S_3$$

where the notations are identical to the notations of equation $eq_{20}$, and $S_3$ is a relative deviation threshold chosen according to the waveforms from the database used, or for example being comprised, broadly speaking, between 100 MHz and 10 GHz.

The number of pulses per plateau criterion makes it possible to determine the plateaus having close numbers of pulses. Indeed, observing different waveforms makes it possible to determine a threshold beyond which two plateaus are incompatible.

According to the number of pulses criterion, two compatible elements each verify the following equation $eq_{22}$:

$$\frac{|Nth_{plateau} - Nth_{moy}|}{Nth_{plateau} + Nth_{moy}} < S_4$$

where $Nth_{plateau}$ is the number of theoretical pulses of one of the elements to be tested, $Nth_{moy}$ is the mean theoretical number of pulses derived from joining two elements to be tested, and $S_4$ is a threshold determined as a function of the waveform database used or for example comprised, broadly speaking, between 5% and 30% for high or medium recurrence frequency waveforms.

During the first sub-step 200 of the association with switching step 190, the distance measurement d makes it possible to select, from among the compatible elements of the algorithm, that which shares the most features with the reference group $g_{réf}$ of the algorithm. The sought shared features are the following: one of the pulse widths LI of the reference group $g_{réf}$ is close to the pulse width LI of a pulse of a candidate element, the reference group $g_{réf}$ has a shape factor close to the shape factor of a candidate element, the reference group $g_{réf}$ shares one of its carrier frequencies with a candidate element, or the reference group $g_{réf}$ has the same number of theoretical pulses as one of the candidate elements.

The distance d is defined by a score given by the following equation $eq_{23}$:

$$d = 1*b + 1*c + 1*e + 1*g + 1*h + \text{score}$$

where b is a number equal to 1 if the two elements to be compared do not have a shared shape factor, and equal to 0 otherwise, c is a number equal to 1 if the two elements to be compared do not have shared pulse widths, and equal to 0 otherwise, e is a number equal to 1 if the two elements to be compared do not have a shared theoretical number of pulses, and equal to 0 otherwise, g is a number equal to 1 if the two elements to be compared do not have a shared pulse repetition interval PRI, and equal to 0 otherwise, h is a number equal to 1 in the case of single-plateaus where the two elements to be compared do not have a shared pulse carrier frequency, and equal to 0 otherwise, and score is a threshold comprised between 0 and 1 and given by the following equation eq$_{24}$:

$$\text{score} = \frac{1}{2}\left(\frac{TOA_{deb,2} - TOA_{fin,1}}{\Delta t_{ref}} + \left|\frac{f_2 - f_{moy,1}}{\Delta f_{ref}}\right|\right)$$

where TOA$_{deb,2}$ is the time of arrival of the first pulse of the element, where TOA$_{fin,1}$ is the time of arrival of the last pulse of the reference group, f$_{moy,1}$ is the mean carrier frequency of the reference group g$_{réf}$, f$_2$ is the carrier frequency of the pulses of the element, $\Delta t_{ref}$ is a value chosen according to the statistics on the waveforms from the database used or a value comprised, broadly speaking, between 1 ms and 10 ms, $\Delta f_{ref}$ is a value chosen according to the statistics on the waveforms from the database used were for example able to be equal to the threshold S$_3$ of equation eq$_{21}$. Alternatively, another distance d may also be used.

The update of the features of each group obtained at the end of the first sub-step 200 of the association with switching step 190 is identical to the update done during the association with overlap step 180.

The second sub-step 210 of the association with switching step 190 is strictly identical to the first sub-step 200 of the association with switching step 190, with the exception that each element of the algorithm is a pulse plateau P$_1$, ..., P$_p$ having a variable carrier frequency and each group of the algorithm is a group of pulse plateaus G$_1$, ..., G$_g$ with variable carrier frequency switching. Furthermore, in the case of the second sub-step 210, the set of elements E of the algorithm is the set of pulse plateaus P$_1$, ..., P$_p$ having a variable carrier frequency.

Furthermore, the shared feature according to which the reference group g$_{réf}$ shares one of its carrier frequencies with a candidate element is not sought during this second sub-step 210, and the number h of equation eq$_{23}$ is still zero during this second sub-step 210.

Thus, at the end of the association with overlapping step 180 and the association with switching step 190, three types of groups of pulse plateaus G$_1$, ..., G$_g$ are obtained: a first type of groups of pulse plateaus G$_1$, ..., G$_g$ with overlapping, a second type of groups of pulse plateaus G$_1$, ..., G$_g$ with fixed carrier frequency switching, and a third type of groups of pulse plateaus G$_1$, ..., G$_g$ with variable carrier frequency switching. Each type of group groups together radar signals having shared features. Each group results from the concatenation of pulse trains T$_1$, ..., T$_n$ forming the pulse plateaus P$_1$, ..., P$_p$ associated during the association steps 180 and 190. Each group is therefore a deinterleaved radar signal formed from the concatenation of pulses according to a grouping law and an association law.

FIG. 13 illustrates the deinterleaving chain for radar signals. In this FIG. 13, three radar transmitters E$_{radar}$ are transmitting radar signals that are intercepted by the receiver 12. The signals received by the receiver 12 and coming from different radar transmitters are mixed and superimposed with one another. The implementation of the method according to the invention by the computer 14 makes it possible to group the pulse trains from a same radar transmitter together and to thus obtain three groups of deinterleaved radar signals.

Thus, the deinterleaving method according to the invention makes it possible to group the pulse trains T$_1$, ..., T$_n$ together separately of different radar signals whose pulse repetition interval is medium or short, in a dense electromagnetic environment.

The grouping laws and the association laws used to group the pulse trains T$_1$, ..., T$_n$ of a same radar signal together implement a first phase for selecting compatible elements and a second phase for minimizing a distance d. The first selection phase in particular makes it possible to eliminate the pulse trains T$_1$, ..., T$_n$ or pulse plateaus P$_1$, ..., P$_p$ not having the same structural features and to thus do away with obtaining erroneous deinterleaved signals. Thus, the set of criteria C allows quick elimination of elements of the algorithm that are incompatible with one another. The speed of the algorithm is thus better than O(N$^2$), with N the initial number of elements of the set of elements E of the algorithm, i.e., the calculation time of the algorithm increases less quickly than the square of the number of elements to be treated. The algorithm for grouping pulse trains together generally requires a calculation time of less than several milliseconds or tens of milliseconds on a current processor.

Furthermore, the distance d to be minimized is specific to each of the grouping and association laws so as to account for the structural features of each of the group types, in particular.

The classification step 140 classifies, then processes the pulse trains T$_1$, ..., T$_n$ as a function of a waveform to which the pulse trains T$_1$, ..., T$_n$ belong. The waveform databases are therefore used so as to carry out processing suitable for the different types of waveforms. For example, the association with overlap step 180 is specific to fixed carrier frequency waveforms, having pulse plateaus P$_1$, ..., P$_p$ that are superimposed over time, in particular FMICW waveforms. Without the association with overlap step 180, such waveforms would not have been grouped together optimally during the association with switching step 190.

Furthermore, the step 120 for rejecting inconsistent pulse trains T$_1$, ..., T$_n$ in terms of pulse repetition intervals PRI, and optionally carrier frequency of the pulses, makes it possible to perform an initial sort of the nonviable pulse trains T$_1$, ..., T$_n$. Thus, the inconsistent pulse trains T$_1$, ..., T$_n$ are eliminated.

Likewise, step 130 for rejecting pulse trains T$_1$, ..., T$_n$ not belonging to predefined waveforms makes it possible to increase the precision of the grouping of pulse trains T$_1$, ..., T$_n$ during the grouping step 150 and the precision of the association of the pulse plateaus P$_1$, ..., P$_p$ during the association steps 180 and 190.

Furthermore, scattering is also taken into account, since the grouping and association laws of the method include the hypothesis of double, or even triple pulse repetition intervals PRI.

Thus, the deinterleaving method is innovative due to its better monitoring of input data, its prioritization of the steps of the deinterleaving method, which allows data classification that is both faster and closer to reality, and the use of grouping rules based on actual waveform databases.

The deinterleaving method makes it possible to group pulse trains together with better reliability than the state of the art, while not deteriorating the speed performance of the algorithms used.

Furthermore, the algorithms of the grouping and association laws are adaptable, to the extent that each of the criteria from the set of criteria C and each of the comparison tests for these criteria can be modified without having to modify all of the algorithms. Likewise, the distance d can also be modified locally for each of these algorithms. Thus, the method according to the invention is perfectly capable of tracking the evolution of radar transmitters over time.

The invention claimed is:

1. A method for deinterleaving radar signals, the method comprising:
    receiving by a receiver electromagnetic signals and extracting pulses from the received signals,
    forming pulse trains grouping together at least three pulses spaced apart by a same pulse repetition interval, each pulse train being defined by the pulse repetition interval,
    wherein the method further comprises:
    grouping together pulse trains having a same pulse repetition interval according to a predefined grouping law in order to form pulse plateaus, and
    associating the pulse plateaus according to at least one predefined association law in order to obtain deinterleaved radar signals formed from a concatenation of the pulse trains of the associated pulse plateaus, said associating comprising at least one grouping phase chosen from among:
        a phase for grouping together pulse plateaus having different pulse repetition intervals and that are linked together over time in order to obtain pulse plateau groups by switching, and
        a phase for grouping together fixed carrier frequency pulse plateaus, having identical pulse repetition intervals and being superimposed over time to obtain pulse plateau groups by overlapping.

2. The method according to claim 1, wherein:
    each pulse train is further defined by at least one element chosen from a group made up of: a time of arrival of the first pulse of the pulse train, a time of arrival of the last pulse of the pulse train, a frequency of the pulses of the pulse train, a duration of the pulses of the pulse train and a direction of arrival of the pulses of the pulse train.

3. The method according to claim 1, wherein the method further comprises:
    before the grouping step, classifying the pulse trains according to their carrier frequency to obtain two classes of pulse trains:
    one class grouping together the pulse trains with a fixed carrier frequency and the other class grouping together the pulse trains with a variable carrier frequency, the grouping step being carried out for each of the two classes of pulse trains and making it possible to obtain single-frequency pulse plateaus from the class of the single-frequency pulse trains and frequency agile pulse plateaus from the class of frequency agile pulse trains.

4. The method according to claim 1, wherein:
    each of the grouping and association laws is implemented by at least one algorithm that allows obtaining groups from elements, the elements designating pulse trains during the grouping step and pulse plateaus during the association step, the groups designating pulse plateaus during the grouping step and groups of pulse plateaus during the association step, the algorithm comprising:
        choosing a reference element from among a set of elements,
        deleting the reference element from the set of elements and adding, in a set of groups, a reference group comprising the reference element,
        selecting, in the set of elements, elements compatible with the reference group according to a set of criteria to obtain a set of candidate elements,
        evaluating a distance between the reference group and each element of the set of candidate elements,
        annexing the element from the set of candidate elements minimizing a distance from the reference group and deleting the annexed element from the set of elements,
        repeating the selection, evaluation and annexing phases as long as the set of candidate elements comprises elements, and
        repeating all of the preceding phases as long as the set of elements comprises elements.

5. The method according to claim 4, wherein the reference element is the element from the set of elements for which a time of arrival of the first pulse is the smallest.

6. The method according to claim 4, wherein the set of criteria evaluates the compatibility of the elements from the set of elements with the reference group based on one or several features, the features being chosen from a group comprising: the direction of arrival of the elements, the temporal superposition of the elements, the carrier frequency of the elements, the pulse width of the elements, the pulse repetition interval of the elements, the phase of the elements and the number of pulses of the elements.

7. The method according to claim 4, wherein the criteria are chosen according to statistics on features of the radar waveforms from a database.

8. The method according to claim 4, wherein:
    for the grouping law, the distance is a time deviation separating a last pulse of the reference group from a first pulse of the candidate elements of the set of candidate elements, and
    wherein for the association law, the distance is an overlap rate between the reference group and the candidate element from the set of candidate elements or a score making it possible to select, among the set of candidate elements, the elements sharing the most features in common with the reference group.

9. The method according to claim 1, further comprising, before the grouping step, rejecting inconsistent pulse trains in terms of pulse repetition interval.

10. The method according to claim 1, further comprising, before the grouping step, rejecting pulse trains for which the pulse repetition interval is above a pulse repetition interval threshold and for which the number of pulses is below a pulse number threshold.

11. A device for deinterleaving radar signals, comprising:
    a receiver able to receive electromagnetic signals,
    a signal digital processing unit able to extract the pulses from the signals received by the receiver, and
    a readable information medium, on which a computer program is stored comprising program instructions, the computer program being able to be loaded on a data processing unit and suitable for driving the implementation of a method according to claim 1 when the computer program is implemented on the data processing unit.

* * * * *